US010199618B2

(12) United States Patent
Pedersen et al.

(10) Patent No.: US 10,199,618 B2
(45) Date of Patent: Feb. 5, 2019

(54) BATTERY ASSEMBLY FOR A HEARING DEVICE (71) Applicant: Oticon A/S, Smørum (DK)

(72) Inventors: Troels Holm Pedersen, Smørum (DK); Oliver Sundberg, Smørum (DK)

(73) Assignee: OTICON A/S, Smørum (DK)

(*) Notice: Subject to any disclaimer, the term of this patent is extended or adjusted under 35 U.S.C. 154(b) by 144 days.

(21) Appl. No.: 15/229,903

(22) Filed: Aug. 5, 2016

(65) Prior Publication Data
US 2017/0040581 A1 Feb. 9, 2017

(30) Foreign Application Priority Data

Aug. 7, 2015 (EP) ..................................... 15180228

(51) Int. Cl.
H01M 2/10 (2006.01)
H04R 25/00 (2006.01)
H01M 2/30 (2006.01)

(52) U.S. Cl.
CPC ........... *H01M 2/1038* (2013.01); *H01M 2/30* (2013.01); *H04R 25/602* (2013.01); *H01M 2220/30* (2013.01)

(58) Field of Classification Search
CPC .............................. H01M 2/1038; H01M 2/30
USPC .......................................................... 429/98
See application file for complete search history.

(56) References Cited

U.S. PATENT DOCUMENTS 3,856,577 A * 12/1974 Oki ........................ G04C 10/00
429/123
2008/0268296 A1 10/2008 Larsen
2013/0195303 A1* 8/2013 Tada .................... H04R 25/602
381/323

FOREIGN PATENT DOCUMENTS

| EP | 0981095 A1 | 2/2000 |
| EP | 2229008 A1 | 9/2010 |
| JP | 2000-11979 A | 1/2000 |
| JP | 2001-6649 A | 1/2001 |
| WO | 98/47319 A1 | 10/1998 |

* cited by examiner

Primary Examiner — Cynthia H Kelly
Assistant Examiner — Rashid A Alam
(74) Attorney, Agent, or Firm — Birch, Stewart, Kolasch & Birch, LLP (57) ABSTRACT A battery assembly for an electronic device such as a hearing aid is disclosed. The battery assembly includes; a compartment having a longitudinal axis and a transversal axis and being configured to receive and contain a battery; at least one electrical connection member for establishing electrical connection to a negative pole of the battery; at least one electrical connection member for establishing electrical connection to a positive pole of the battery; a guide structure configured to guide the battery into a predefined position in the compartment. The guide structure guides the battery into electrical connection with a first electrical connection member. A second electrical connection member when the battery is in a first configuration. The guide structure guides the battery into electrical connection with the first electrical connection member and a third electrical connection member when the battery has a reversed orientation.

16 Claims, 6 Drawing Sheets

BATTERY ASSEMBLY FOR A HEARING DEVICE

FIELD OF INVENTION

The present disclosure relates to a battery assembly for a hearing device. More particularly, the present disclosure relates to a battery assembly that is able to properly accommodate an inserted battery regardless of orientation of the polarity of the inserted battery in the battery assembly.

BACKGROUND

Most hearing devices are energised by a small battery housed in a battery compartment. Hearing device user having bad finger dexterity, are often challenged by inserting the battery correctly in the battery compartment of the hearing device such as a behind-the-ear (BTE) hearing aid. This challenge is in particular a problem for hearing devices configured to be placed completely or almost completely in the ear canal (e.g. In-The-Ear (ITE) hearing devices).

The problem is typically, that the battery is required to be oriented in one predefined way in order to fit into the battery compartment. A typical hearing device is operated by a battery that is inserted into a battery compartment normally integrally formed with the hearing device. Conventional hearing device battery compartments are equipped with two electrical contacts, one adapted to electrically contact with the positive pole of the battery while the other is designed to electrically contact the battery's negative pole. Accordingly, the polarity of the battery is of crucial importance in the sense that the hearing device will not operate unless the battery is properly inserted into the battery compartment, i.e., is inserted with such an orientation that each of the battery poles contacts the correct compartment contact.

To help insure that the battery is inserted in the proper orientation, a battery installation drawing or diagram may be printed or embossed on the battery compartment or in the vicinity thereof, indicating the proper orientation in which the batteries should be inserted into the compartment.

Such drawings or diagrams may however, often be difficult to read or interpret by the hearing device user, especially in less than ideal lighting or when the hearing device user is a person of limited capacity to see, understand or implement the instructions implicit in the battery installation drawing or diagram.

Accordingly, it would be useful to have, a battery assembly, which will make it possible to install a battery into a battery-operated hearing device regardless of the orientation of the battery and which will automatically allow the battery polarities to be in contact with the correct compartment contacts so as to render the installed battery operative.

SUMMARY OF THE INVENTION

Preferred embodiments of the present disclosure can be achieved by a battery assembly as defined in claim 1. Other preferred embodiments are defined in the dependent sub claims, explained in the following description and illustrated in the accompanying drawings.

According to an aspect of the disclosure, the battery assembly is a battery assembly for an electronic device, which battery assembly comprises:

a compartment having a longitudinal axis and a transversal axis and being configured to receive and contain a battery;

at least one electrical connection member for establishing electrical connection to a negative pole of the battery;

at least one electrical connection member for establishing electrical connection to a positive pole of the battery;

a guide structure configured to guide the battery into a predefined position in the compartment, wherein the guide structure is configured to receive and guide the battery into electrical connection with a first electrical connection member and a second electrical connection member when the battery is in a first configuration;

wherein the guide structure is configured to receive and guide the battery into electrical connection with the first electrical connection member and a third electrical connection member when the battery is in a second configuration, in which the battery has a reversed orientation compared with the first configuration.

According to an embodiment, the guide structure includes a curved open receiving section and a generally circular shaped guide. The curved open receiving section comprises two open unconnected ends that are configured to receive the battery. The guide structure further includes a circular shaped guide running between the curved open receiving section, the circular shaped guide being configured to guide the battery. The guiding of the battery allows for establishing electrical connection between the battery and respective electrical connection members depending upon whether the battery is in the first configuration or the second configuration.

Hereby, the battery assembly makes it possible to install a battery into the battery assembly of a battery-operated hearing device without regard to the orientation of the battery. The battery assembly will automatically allow the battery polarities to be in contact with the correct compartment contacts so as to render the installed battery operative.

The longitudinal axis may be defined as an axis extending along the length of the electronic device, whereas the transversal axis extends perpendicular to the longitudinal axis.

In an embodiment, the electronic device such as a hearing device is a hearing aid. The battery assembly may be understood as the battery assembly/compartment for a hearing device of any suitable type and size. In principle, all battery operated hearing devices may be provided with a battery assembly according to the disclosure.

The battery assembly comprises a compartment having a longitudinal axis and a transversal axis and is configured to receive and contain a battery. It may be useful that the battery assembly is adapted to receive a basically disk-shaped battery or a rod-shaped battery and that the longitudinal axis of the battery assembly extends radially with respect to the battery, while the transversal axis of the battery assembly extends axially with respect to the battery. Radially is to be interpreted as across the circumferential periphery of the battery and axially is to be interpreted as along the thickness of the battery when the battery is in position.

The at least one electrical connection member for establishing electrical connection to the negative pole of the battery may have any suitable shape and may be formed as a flexible structure configured to remain in/maintain its electric contact with the negative pole of the battery, wherein the flexible structure exerts a force towards the negative pole of the battery due to displacement of a portion of the flexible structure. The flexible structure may be shape as a flat spring blade or other kinds of spring types.

Likewise, the at least one electrical connection member for establishing electrical connection to the positive pole of the battery may have any suitable shape and may be formed as a flexible structure configured to remain in/maintain its electric contact with the positive pole of the battery. Again, the flexible structure may be adapted to exert a force towards the positive pole of the battery caused by a displacement of a portion of the flexible structure.

The guide structure is configured to guide the battery into a predefined position in the compartment, and the guide structure is configured to receive and guide the battery into electrical connection with the first electrical connection member and the second electrical connection member when the battery is in a first configuration.

According to an embodiment, the guide structure includes a curved open receiving section and a generally circular shaped guide. The curved open receiving section comprises two open unconnected ends that are configured to receive the battery. The guide structure further includes a circular shaped guide running between the curved open receiving section, the circular shaped guide being configured to guide the battery. The guiding of the battery allows for establishing electrical connection between the battery and the first electrical connection member and the second electrical connection member when the battery is in a first configuration.

Hereby, the battery is "automatically" positioned in the right position when the battery is arranged in its first configuration.

Likewise, the guide structure is configured to receive and guide the battery into electrical connection with the first electrical connection member and the third electrical connection member when the battery is in a second configuration, in which the battery has a reversed orientation compared with the first configuration.

According to an embodiment, the guide structure includes a curved open receiving section and a generally circular shaped guide. The curved open receiving section comprises two open unconnected ends that are configured to receive the battery. The guide structure further includes a circular shaped guide running between the curved open receiving section, the circular shaped guide being configured to guide the battery. The guiding of the battery allows for establishing electrical connection between the battery and the first electrical connection member and the third electrical connection member when the battery is in a second configuration.

Hereby, the battery is "automatically" positioned in the right position, when the battery is arranged in the second configuration.

When applying a disk-shaped battery, at least one polarity such as negative polarity of the battery will be reversed in the second configuration compared to the first configuration.

According to another aspect of the disclosure, the first electrical connection member is the electrical connection member for the positive pole of the battery, wherein the second electrical connection member and the third electrical connection member is for the negative pole of the battery. The electrical connection members of the battery assembly may be understood as the compartment contacts.

Hereby, the first electrical connection member may be arranged in a position in which the outside periphery of the battery is accessible to the first electrical connection member regardless of the orientation of the battery, the periphery defining one of the polarities of the battery.

The second electrical connection member and the third electrical connection member may be arranged in a position in which the second electrical connection member is brought in electrical contact with the negative pole of the battery when the battery is inserted in a first configuration, whereas the third electrical connection member is brought in electrical contact with the negative pole of the battery when the battery is inserted in a second configuration, in which the battery is arranged in a different (e.g. reversed) orientation compared with the first configuration.

The second electrical connection member and the third electrical connection member may be positioned opposite to each other within the battery assembly.

According to yet another aspect of the disclosure, the guide structure is configured to displace the battery along the transversal axis of the compartment and hereby establish electric contact with the second electrical connection member or the third electrical connection member.

Hereby, it is possible to displace the battery along the transversal axis of the compartment and hereby bring the battery into the desired position in the compartment.

By the term "displace" used in this context is meant "move" or "translate" e.g. along a one-dimensional movement path.

According to a further aspect of the disclosure, the first electrical connection member is arranged in a position in which the guide structure establishes contact with the periphery of the battery, the periphery defining one of the polarities of the battery.

Hereby it is possible to establish electrical contact between the first electrical connection member and the polarity of the periphery of the battery when the battery is oriented in the first configuration or in the second configuration.

When having a disk-shaped battery, the periphery of the battery typically represents the positive pole of the battery. Accordingly, the first electrical connection member is arranged in a position in which the guide structure allows for establishing contact of the first electrical connection member with the positive pole of the battery independent of the orientation of the battery (when the battery is oriented in the first configuration or in the second configuration).

According to another aspect of the disclosure, the compartment comprises a first compartment structure and a second compartment structure and wherein a first guide member is attached to the first compartment structure and wherein a second guide member is attached to the second compartment structure.

Hereby, the battery can be guided by the first guide member attached to the first compartment structure when the battery is oriented in one configuration (e.g. the first orientation). The battery can be guided by the second guide member attached to the second compartment structure when the battery is oriented in another configuration (e.g. the second orientation).

This construction makes it possible to utilize the first guide member attached to the first compartment structure when the battery is orientated in one configuration (e.g. the first configuration) and utilize the second guide member attached to the second compartment structure when the battery is orientated in another configuration (e.g. the second configuration). In another embodiments, the structures may be designed such that a single guide member may be adapted to orient the battery in a desired orientation.

According to yet another aspect of the disclosure, the second guide member is configured to displace the battery towards the first compartment structure and hereby establish contact to a second electrical connection member, wherein the first guide member is configured to displace the battery towards the second compartment structure and hereby establish contact with a third electrical connection member.

According to a further aspect of the disclosure, the first guide member is configured to guide the battery towards the first compartment structure and hereby establish contact to a second electrical connection member, wherein the second guide member is configured to guide the battery towards the second compartment structure and hereby establish contact with a third electrical connection member.

Hence, to position battery in the first orientation, the first guide member is configured to guide the battery towards the second electrical connection member while the second guide member is configured to displace the battery towards the first compartment structure. Similarly, to position the battery in the second orientation, the second guide member is configured to guide the battery towards the third electrical connection member while the first guide member is configured to displace the battery towards the second compartment structure.

In an embodiment, the battery may be held in position in the first orientation because of the spring force that the battery experiences between the second electrical connection member and the second guide member. In another embodiment, the battery may be held in position in the second orientation because of the spring force that battery experiences between the third electrical connection member and the first guide member.

Hereby, the guide members can establish contact to the desired electrical connection members in a simple and reliable manner by providing a displacement of the battery towards the desired compartment structure.

According to another aspect of the disclosure, the second guide member is configured to displace the battery towards the first compartment structure and hereby establish contact to the second electrical connection member, wherein a gap/space is provided between the battery surface and the third electrical connection member.

Similarly, according to another aspect of the disclosure, the first guide member is configured to displace the battery towards the second compartment structure and hereby establish contact to the third electrical connection member, wherein a gap/space is provided between the battery surface and the second electrical connection member.

According to a further aspect of the disclosure, the first guide member is configured to guide the battery towards the first compartment structure and hereby establish contact to the second electrical connection member, wherein a gap/space is provided between the battery surface and the third electrical connection member.

Similarly, according to another aspect of the disclosure, the second guide member is configured to guide the battery towards the second compartment structure and hereby establish contact to the third electrical connection member, wherein a gap/space is provided between the battery surface and the second electrical connection member.

Hereby, it is achieved that the gap/space will secure that no electrical contact is established between the battery and the electrical connection member being spaced from the battery. Accordingly, the battery (e.g. the negative pole of the battery) will be electrically connected to either the second electrical connection member in the first orientation or to the third electrical connection member in the second orientation (reversed orientation).

According to a further aspect of the disclosure, the guide members comprise a central concave portion.

Hereby, the guide members are capable of receiving and securing the battery in the central concave portion of the guide members. Thus, the battery may be held in position by allowing a part of the battery to rest in the central concave portion.

According to yet another aspect of the disclosure, the central concave portion is provided with convex end portions.

Hereby, it is possible to utilize the convex end portions to guide the battery in the desired direction preferably towards the desired compartment structure.

The convex end portions may be slightly twisted in order to guide the battery in several independent directions.

According to another aspect of the disclosure, the battery assembly comprises a lid typically rotatably attached to the compartment. The lid is adapted to lock in the closed position by means of a locking means such as a snap lock or other type of mechanical lock.

Hereby, it is possible to close an opening in the battery assembly and hereby protect the compartment and the battery positioned therein.

The lid may be rotatably attached to both a first compartment structure and to a second compartment structure of the compartment.

According to yet another aspect of the disclosure, the lid comprises a retainer structure configured to receive and retain the battery.

By having a lid that comprises a retainer structure configured to receive and retain the battery it is possible to place the battery in the retainer structure and hereafter close the lid in order to position the battery in a correct position, in which the necessary electrical connections are established.

According to an aspect of the disclosure, the retainer structure comprises a first pair of retainer members configured to receive the battery and restrict displacement/movement of the battery along the longitudinal axis of the battery/transversal axis of the battery assembly. The restricted displacement means that the battery is stationary along the longitudinal axis of the battery/transversal axis of the battery assembly when retained in the retainer structure. The longitudinal axis of the battery may be defined as running along the thickness of the battery. The retainer structure comprises a second pair of retainer members configured to receive and bear against the periphery of the battery. The second pair of retainer members may restrict displacement of the battery along the transversal axis of the battery/longitudinal axis of the battery assembly. The transversal axis of the battery may be defined as running radially to the battery across the periphery of the battery.

Hereby, the retainer structure is capable of securing the battery within a desired position so that the guide structure can guide the battery into electrical connection with the desired electrical connection members, i.e. the first electrical connection member and second electrical connection member or third electrical connection member.

According to a further aspect of the disclosure, the retainer structure defines a space sufficiently large to receive the battery and to allow for displacement of the battery along the longitudinal axis of the battery/transversal axis of the battery assembly in order to bring the battery into electrical connection with the second electrical connection member or into electrical connection with the third electrical connection member. The displacement is such that one of the poles of the battery is closer to closer to the second electrical connection member and away from the third electrical connection member in the first orientation or vice versa in the reversed orientation.

Hereby, it is possible to secure the battery in the retainer structure and still allow the battery to be positioned in a particular orientation based on guidance and displacement provided to the battery by means of the guide structure.

Thus, in an embodiment, the battery may be retained in the battery assembly by the retainer structure and in a particular orientation by utilizing a guide member along with its concave portion and the spring force that the battery experiences between an electrical connection member in contact with the pole of the battery and the guide member opposite to the electrical connection member.

According to an even further aspect of the disclosure, the second electrical connection member and the third electrical connection member are electrically connected by an electric connection.

Hereby, it is possible to apply both the second electrical connection member and the third electrical connection member to establish electrical contact with the same pole of the battery in different configurations.

The second electrical connection member, the third electrical connection member and the electrical connection may be a one-piece body, e.g. a metal member manufactured from a metal plate material. In another embodiment, the second electrical connection member, the third electrical connection member and the electrical connection may be separate parts. The second electrical connection member, the third electrical connection member and the electrical connection may be manufactured in same or different ways.

According to a further aspect of the disclosure, an aperture is provided in the first compartment structure and/or in the second compartment structure.

Hereby it is possible to allow the second electrical connection member and/or the third electrical connection member to be displaced in a direction away from the central portion of the battery assembly (and the battery when it is received by the battery assembly).

According to another aspect of the disclosure, the second electrical connection member and/or the third electrical connection member are provided with a protrusion member at the distal end. The protrusion member may be adapted to protrude inward towards the compartment.

A protrusion member provided at the distal end of the second electrical connection member and/or the third electrical connection member makes it easier to establish an electrical contact between the pole (e.g. the negative pole) of the battery and the second electrical connection member or the third electrical connection member in dependence on the orientation of the battery in the battery assembly.

According to an embodiment, the battery assembly is adapted to be used in a hearing aid. Thus, the disclosure discloses a hearing aid comprising the battery assembly wherein the battery assembly is adapted to include one or more features disclosed herein.

According to an embodiment, a hearing aid is disclosed, the hearing aid comprises the disclosed battery assembly.

BRIEF DESCRIPTION OF THE DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effects will be apparent from and elucidated with reference to the illustrations described hereinafter in which:

DETAILED DESCRIPTION OF THE INVENTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus are described by various blocks, functional units, modules, components, steps, processes etc. (collectively referred to as "elements"). Depending upon the particular application, design constraints or other reasons, these elements may be implemented using electronic hardware, computer programs, or any combination thereof.

The following disclosure is illustrated in relation to a hearing device such as a hearing aid. However, the skilled person would appreciate that the disclosed battery assembly may be used with other electronic devices as well.

The battery assembly may be integrated in a hearing device that may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device adapted to receive an audio signal electronically, possibly modifying the audio signal and providing the possibly modified audio signals as an audible signal to at least one of the user's ears. Such audible signals may be provided in the form of an acoustic signal radiated into the user's outer ear.

The hearing device may be adapted to be worn in any known way. This may include i) arranging a unit of the hearing device behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

The battery assembly may be applied in a "hearing system" referring to a system comprising one or two hearing aid devices. The hearing system may include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of the following: remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, or a PC. The audio gateway is further adapted to select and/or combine an appropriate signal out of the received audio signals (or combination of signals) for transmission to the at least one hearing device. The remote control is adapted to control functionality and operation of the at least one hearing devices. The function of the remote control may be implemented in a SmartPhone or another electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such a directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

Figure 1A:
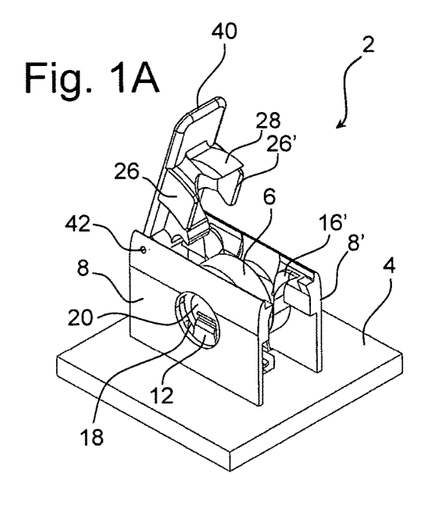
FIG. 1A shows a perspective view of a battery assembly according to an embodiment of the disclosure.
Figure 1B:
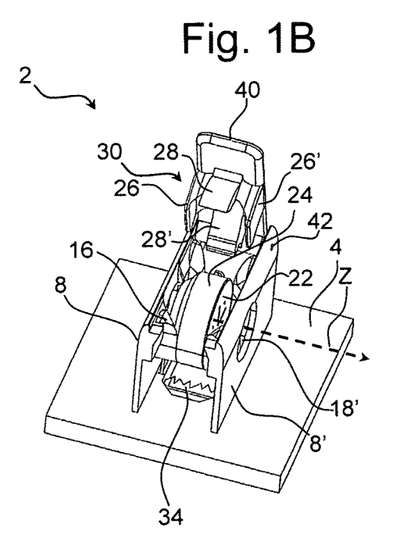
FIG. 1B shows another perspective view of the battery assembly shown in FIG. 1A.
Figure 1C:
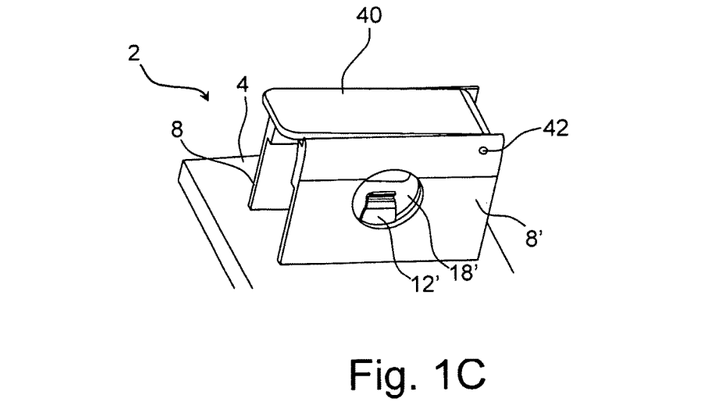
FIG. 1C shows another perspective view of the battery assembly shown in FIG. 1A and in FIG. 1B.

Referring now in detail to the drawings for the purpose of illustrating preferred embodiments of the disclosure, FIG. 1 illustrates three different perspective views of a battery assembly 2 according to an embodiment of the disclosure.

FIG. 1A illustrates a first perspective view of a battery assembly 2 according to an embodiment of the disclosure. FIG. 1B shows another perspective view of the battery assembly 2 shown in FIG. 1A, whereas FIG. 1C shows another perspective view of the battery assembly 2 shown in FIG. 1A and in FIG. 1B, however, no battery 6 is receive by the battery assembly 2 shown in FIG. 1C.

The battery assembly 2 is integrated with a base structure 4 that may be an integral part of a hearing device, e.g. a BTE hearing device. The battery assembly 2 comprises a compartment having a first compartment structure 8 and a second compartment structure 8' at a distance from the first compartment structure 8. This distance would typically be greater than a width of the battery.

A first guide member 16 is attached to the inside portion of the first compartment structure 8, whereas a second guide member 16' is attached to the inside portion of the second compartment structure 8'.

A lid 40 is rotatably attached to the first compartment structure 8 and to the second compartment structure 8' by means of joints 42. The lid is thus configured to rotate around a pivot axis, which is defined by the joints at the first compartment structure and second compartment structure respectively. The lid 40 is equipped with a retainer structure 30 configured to receive and secure a battery 6 and restrict displacement of the battery 6. In another embodiment, instead of a rotatable lid; a releasable push-in lid may be provided, the push-in lid is configured to be inserted in and out of the space defined between the first compartment structure and the second compartment structure.

The retainer structure 30 comprises a first pair of retainer members 26, 26' axially displaced from each other and being configured to receive the battery 6 and restrict displacement/movement of the battery 6 along the longitudinal axis Z of the battery 6/transversal axis Y of the battery assembly 2. The restricted displacement means that the battery 6 is stationary along the longitudinal axis Z of the battery 6/transversal axis Y of the battery assembly 2 when the battery 6 is retained in the retainer structure 30. The longitudinal axis of the battery may be defined as running along the thickness of the battery. The retainer structure 30 further comprises a second pair of retainer members 28, 28' configured to receive and bear against the periphery 24 of the battery 6. The second pair of retainer members usually stretch outward to receive the battery and retracts inward to hold the battery by bearing against the periphery of the battery. The retainer member 28, 28' thus restrict displacement of the battery 6 radially along an axis perpendicular to the longitudinal axis Z of the battery 6, i.e. along transversal axis of the battery 6/longitudinal axis X of the battery assembly. The transversal axis of the battery may be defined as running radially to the battery across the periphery of the battery.

The retainer structure 30 defines a space that is sufficiently large to receive the battery 6 and allow the battery 6 to be displaced along the longitudinal axis Z/transversal axis Y of the battery assembly of the battery 6 in order to bring the battery 6 into electrical connection with a second electrical connection member 12 provided at the central region of the first compartment structure 8 or into electrical connection with the third electrical connection member 12' provided at the central region of the second compartment structure 8'. The displacement is such that one of the poles of the battery is closer to closer to the second electrical connection member and away from the third electrical connection member in the first orientation or vice versa in the reversed orientation.

The second electrical connection member 12 and the third electrical connection member 12' are electrically connected by an electrical connection 34 formed as a flat metal structure being an integrated part of a one-piece body consisting of the second electrical connection member 12, the third electrical connection member 12' and the electrical connection 34.

A first aperture 18 is provided in the central portion of the first compartment structure 8 and a second aperture 18' is provided in the central portion of the second compartment structure 8'. The distal portion of the second electrical connection member 12 can be displaced at last partially through the first aperture 18, whereas the distal portion of the third electrical connection member 12 is configured to be displaced at last partially through the second aperture 18'. Hereby, the electrical connection member 12/12' in the first orientation/second orientation can be displaced during insertion of the battery 6 in order to ensure an electric contact with only one of poles such as the negative pole 20 of the battery 6, by displacing the electrical connection members 12/12' outwardly so that the electrical connection members 12/12' exert a force towards the one of the poles such as the negative pole 20 of the battery 6 due to displacement of a portion of the electrical connection members 12, 12'.

Figure 2A:
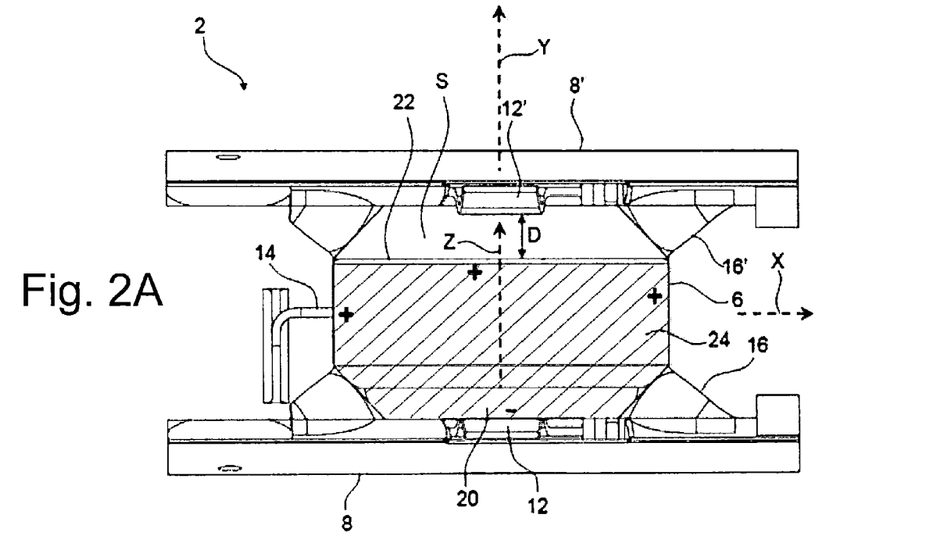
FIG. 2A shows a top view of a battery assembly according to an embodiment of the disclosure, wherein the lid has been removed and the battery has been inserted in a first orientation.

FIG. 2A illustrates a top view of a battery assembly 2 according to an embodiment of the disclosure, wherein the lid has been removed. It can be seen that the battery assembly 2 comprises a compartment having a first compartment structure 8 and second compartment structure 8'. The first compartment structure 8 and the second compartment structure 8' comprise wall structures extending basically parallel to each other.

A first guide member 16 is provided at the inside portion of the first compartment structure 8. Likewise, a second guide member 16' is provided at the inside portion of the second compartment structure 8'. The second guide member 16' is configured to guide the battery 6 (shown with hatched lines) towards the second compartment structure 8' so that an electrical contact is established between the negative pole 20 and the electrical contact member 12, like illustrated in FIG. 2. Similarly, the first guide member 16 is configured to guide the battery 6 towards the second compartment structure 8' so that an electrical contact is established between the negative pole 20 and the electrical contact member 12' when the battery 6 is has an reversed orientation.

In FIG. 2A, a space S is provided between the electrical contact member 12' and the positive pole 22 of the battery 6. Accordingly, the battery 6 is positioned in a distance D from the electrical contact member 12'.

The battery assembly 2 comprises a first electrical connection member 14. The positive pole 22 of the battery 6 is indicated with a "+", whereas the negative pole 20 of the battery 6 is indicated with a "−". It can be seen that the periphery 24 of the battery 6 is also indicated with a "+" since the periphery 24 constitutes a portion of the positive pole of the battery 6. The first electrical connection member 14 is brought into electrical contact with the periphery 24 of the battery 6.

The battery assembly 2 has a longitudinal axis X and a transversal axis Y. It can be seen that the battery 6 is a disk-shaped battery 6 having a longitudinal axis Z and a negative pole 20 protruding along the transversal axis Y of the battery assembly 2. The negative pole 20 has a flat portion extending parallel to the longitudinal axis X of the battery assembly 2. The positive pole 22 also has a flat portion extending parallel to the longitudinal axis X of the battery assembly 2. The first electrical connection member 14 is arranged in a position in which the guide members 16, 16' establish contact with the positive pole of the battery 6 independently of the orientation of the battery 6.

Figure 2B:
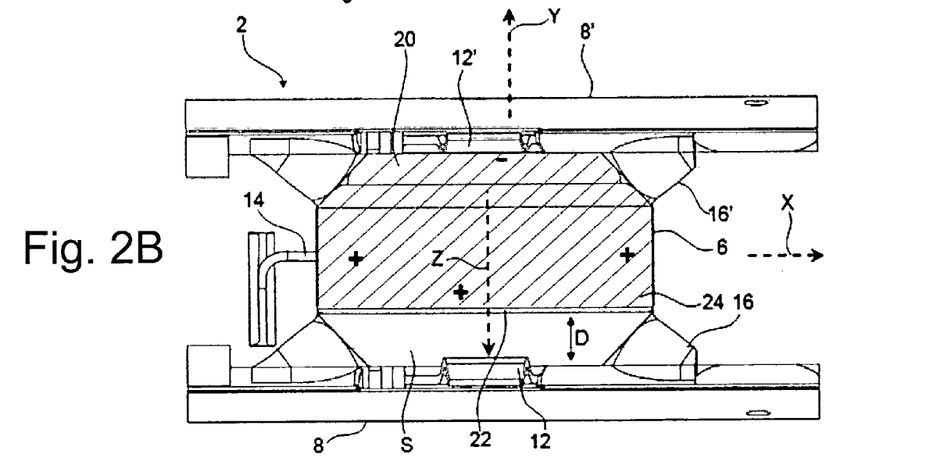
FIG. 2B shows a top view of a battery assembly as the one shown in FIG. 2A, in which the battery has been inserted in a reversed orientation.

FIG. 2B illustrates a top view of a battery assembly 2 shown in FIG. 2A. A battery 6 (shown with hatched lines) has been inserted into the battery assembly 2 in a reversed orientation compared to the orientation illustrated in FIG. 2A. It can be seen that the longitudinal axis of the battery 6 extends parallel to the transversal axis of the battery assembly 2 and perpendicular to the longitudinal axis X of the battery assembly 2. Thus, when the battery 6 is positioned in the battery assembly 2, the longitudinal axis Z of the battery 6 and the transversal axis of the battery assembly 2 coincide.

A space S is established between the battery 6 and the electrical contact member 12, since the battery 6 is positioned in a distance D from the electrical contact member 12. On the other hand, the electrical contact member 12' has been brought into electric contact with the negative pole 20 protruding along the transversal axis Y of the battery assembly 2 and the longitudinal axis Z of the battery 6.

Figure 3A:
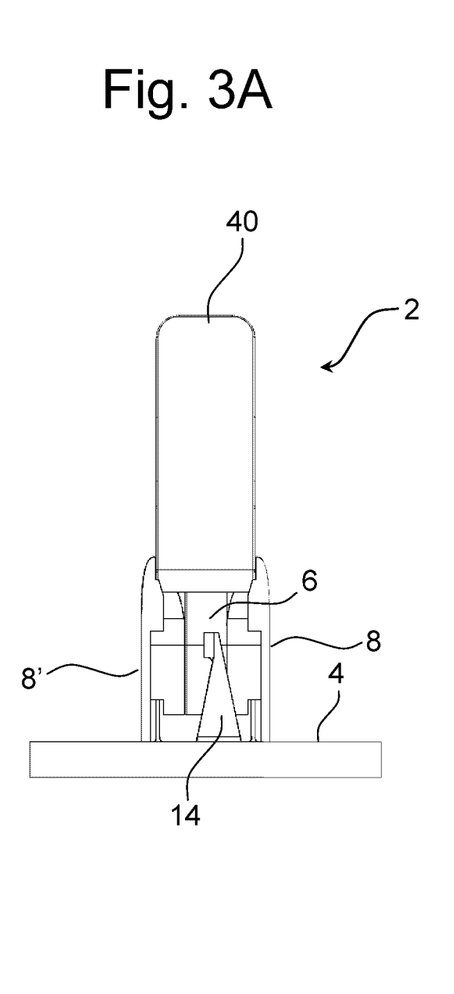
FIG. 3A shows a back view of a battery assembly according to an embodiment of the disclosure.

FIG. 3A illustrates a back view of a battery assembly 2 according to an embodiment of the disclosure. The battery assembly 2 is mounted on a base structure 4 and comprises a compartment having a first compartment structure 8 and second compartment structure 8'. A lid 40 is rotatably attached to the first compartment structure 8 and to the second compartment structure 8'. An open back portion is provided between the first compartment structure 8 and to the second compartment structure 8'. A battery 6 is arranged in the battery assembly 2 and a first electrical connection member 14 is brought into electrical contact with the periphery of the battery 6.

Figure 3B:
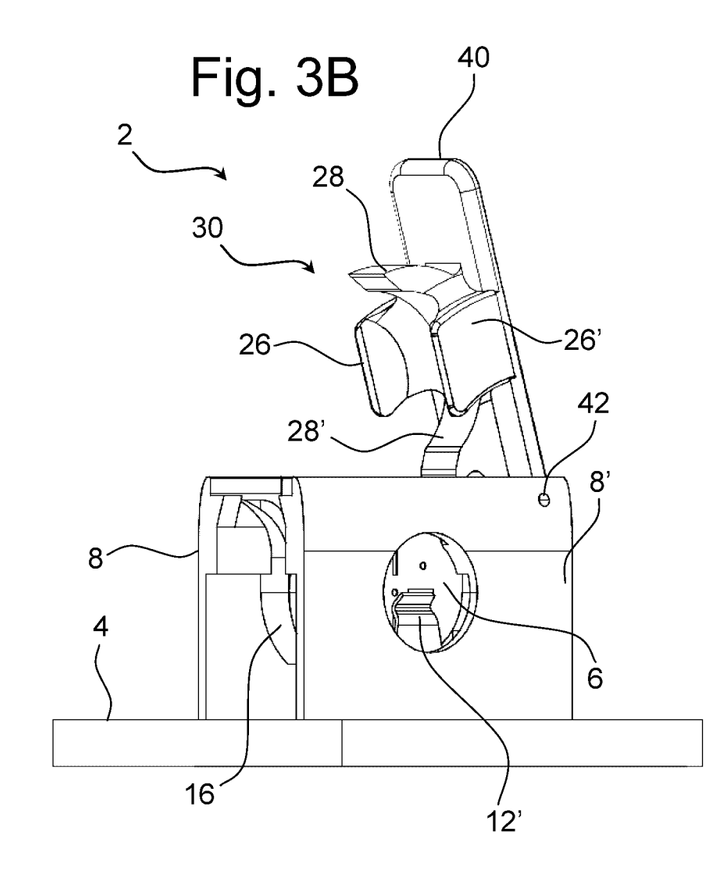
FIG. 3B shows a perspective view of the battery assembly shown in FIG. 3A.

FIG. 3B illustrates a perspective view of the battery assembly 2 shown in FIG. 3A. The battery assembly 2 comprises a compartment having a first compartment structure 8 and a second compartment structure 8'.

A first guide member 16 is attached to the inside portion of the first compartment structure 8 and a lid 40 is rotatably attached to the second compartment structure 8' by means of a joint 42. The lid 40 comprises a retainer structure 30 configured to receive and secure a battery 6. The retainer structure 30 is provided with a first pair of retainer members 26, 26' displaced from each other and being configured to receive the battery 6 and restrict displacement of the battery 6. However, such restriction is limited such that connection of a pole 20 of the battery 6 with the second electrical connection member 12 in the first orientation or connection of the pole 20 of the battery 6 with the third electrical connection member 12' is still possible. The retainer structure 30 comprises a second pair of retainer members 28, 28' configured to receive and bear against the periphery of the battery 6. The retainer member 28, 28' thus restrict displacement of the battery 6 perpendicular to the longitudinal axis Z of the battery 6.

An electrical connection member 12' is provided at the central region of the second compartment structure 8'. The battery 6 is positioned at a distance from the electrical connection member 12'. Accordingly, the battery 6 is not in electrical connection with the electrical connection member 12'.

Figure 4A:
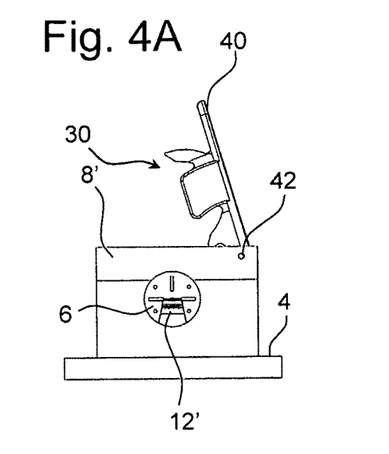
FIG. 4A shows a side view of a battery assembly according to an embodiment of the disclosure.
Figure 4B:
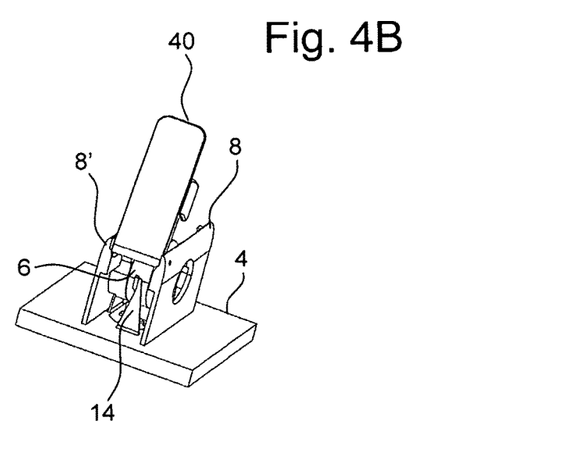
FIG. 4B shows a perspective view of the battery assembly shown in FIG. 4A.
Figure 4C:
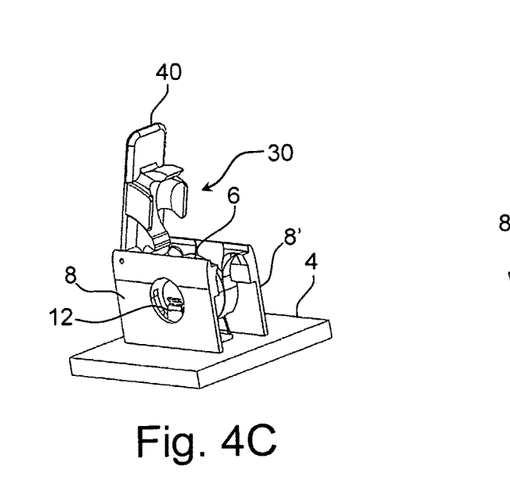
FIG. 4C shows another perspective view of the battery assembly shown in FIG. 4A.
Figure 4D:
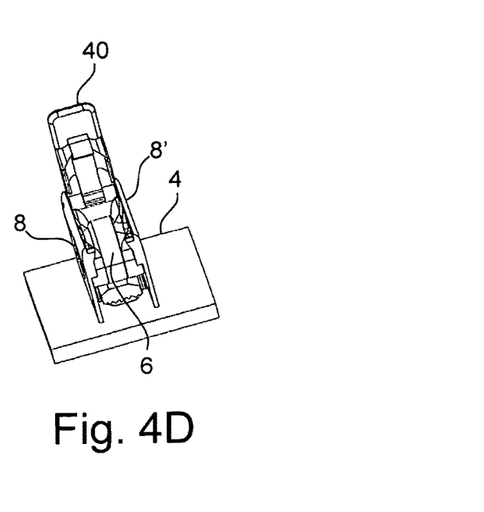
FIG. 4D shows a further perspective view of the battery assembly shown in FIG. 4A

FIG. 4A illustrates a side view of a battery assembly 2 according to an embodiment of the disclosure. FIG. 4B illustrates a perspective view of the battery assembly 2 shown in FIG. 4A. FIG. 4C illustrates another perspective view of the battery assembly 2 shown in FIG. 4A, whereas FIG. 4D illustrates a further perspective view of the battery assembly 2 shown in FIG. 4A.

The battery assembly 2 has a compartment comprising a first compartment structure 8 and a second compartment structure 8'. A battery 6 is received by the battery assembly 2.

A lid 40 is rotatably attached to the first compartment structure 8 and to the second compartment structure 8' by means of a joint 42. The lid 40 comprises a retainer structure 30 similar to the one shown in FIG. 1 and FIG. 3.

A second electrical connection member 12 is provided at the central region of the first compartment structure 8, whereas a third electrical connection member 12' is provided at the central region of the second compartment structure 8'. The battery 6 is positioned in a distance from the third electrical connection member 12'. However, the battery 6 has been brought into electrical contact with the second electrical connection member 12 and with a first electrical connection member 14.

Figure 5A:
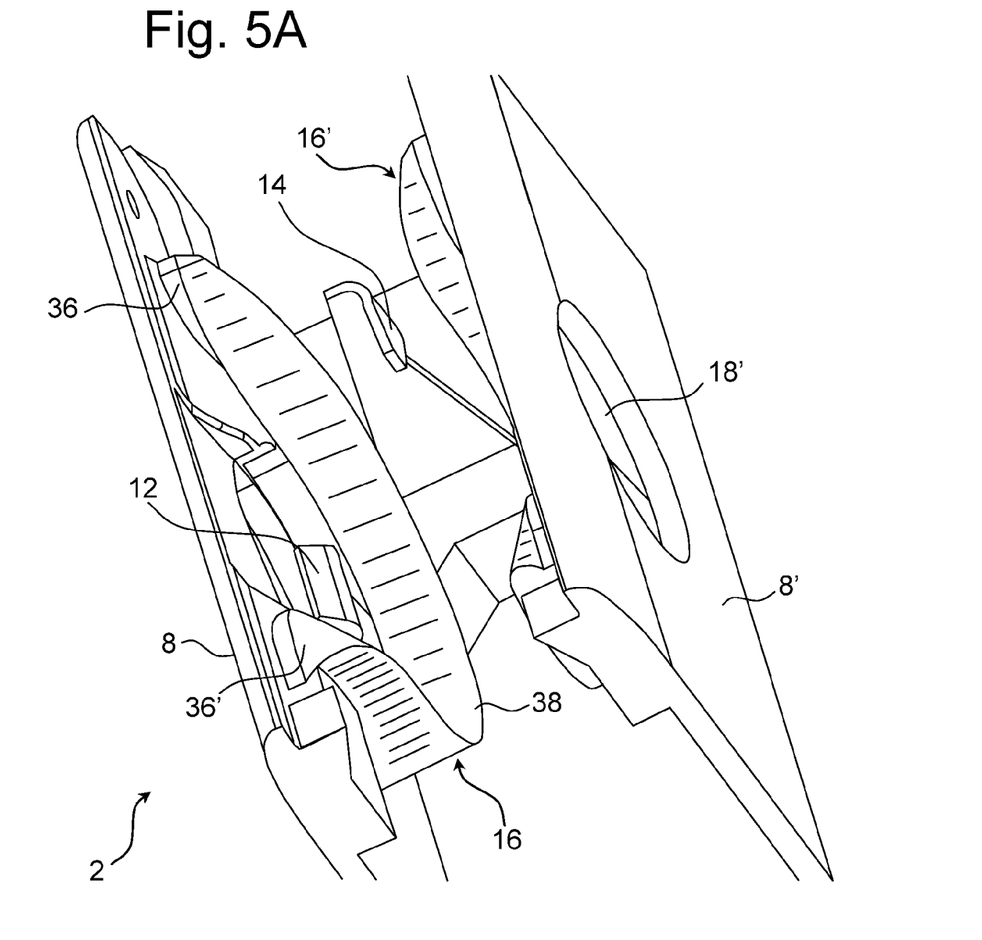
FIG. 5A shows a close-up view of a guide member arranged in a battery assembly according to an embodiment of the disclosure.

FIG. 5A illustrates a close-up view of a guide member 16 arranged in a battery assembly 2 according to an embodiment of the disclosure. The battery assembly 2 comprising a first compartment structure 8 and a second compartment structure 8' and a space defined between these compartment structures 8, 8'. An aperture 18' is provided in the second compartment structure 8'. In this illustration, no battery is received by the battery assembly 2.

A second electrical connection member 12 is provided at the central region of the first compartment structure 8. The guide member 16 comprises a concave portion 38 extending between convex portions 36, 36'. The concave portion 38 is configured to receive and secure a battery in the central concave portion of the guide members 16, 16'.

Depending upon the orientation of the battery, the convex end portions are configured to guide or displace a battery towards either the first compartment structure 8 or the first compartment structure 8'. The convex end portions are slightly twisted in order to guide or displace a battery inwardly and downwardly at the same time.

A first electrical connection member 14 is provided at the back portion of the battery assembly 2 between the first compartment structure 8 and the second compartment structure 8'.

Figure 5B:
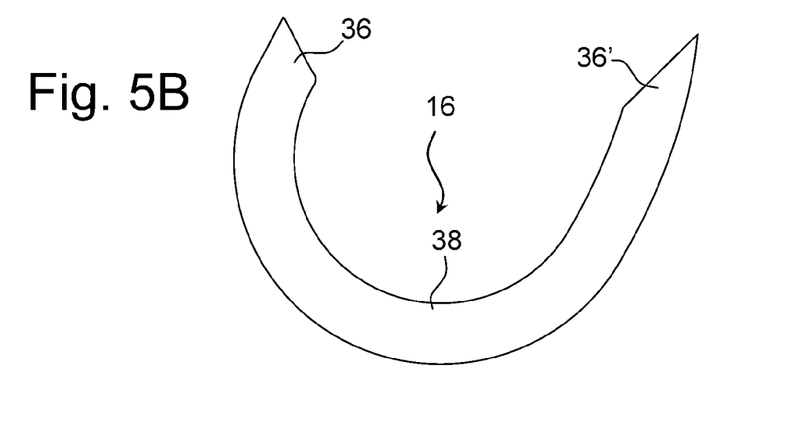
FIG. 5B shows a schematic side view of a guide member of a battery assembly according to an embodiment of the disclosure.

FIG. 5B illustrates a schematic side view of a guide member 16 of a battery assembly according to an embodiment of the disclosure. The guide member 16 has a basically U-shaped side profile and comprises a central concave portion 38 extending between convex portions 36, 36'.

Figure 6A:
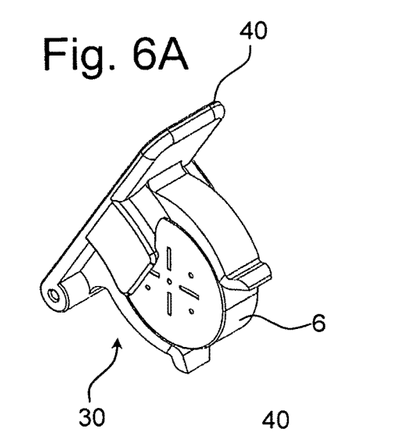
FIG. 6A shows a perspective view of a battery arranged in a retainer structure according to an embodiment of the disclosure.
Figure 6B:
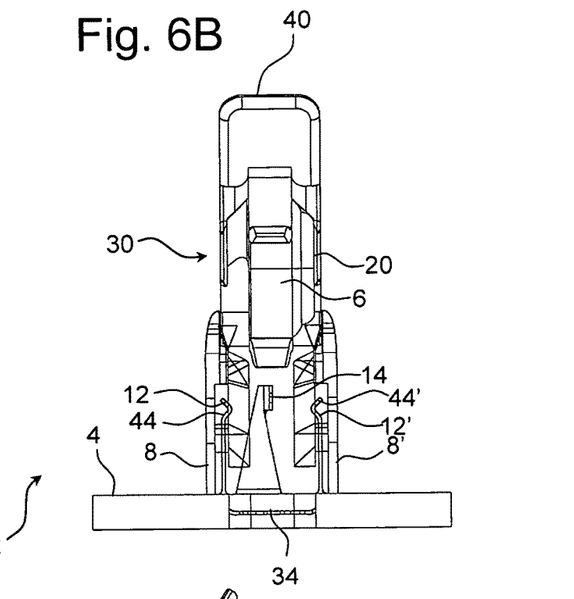
FIG. 6B shows a schematic back view of a battery assembly according to an embodiment of the disclosure.
Figure 6C:
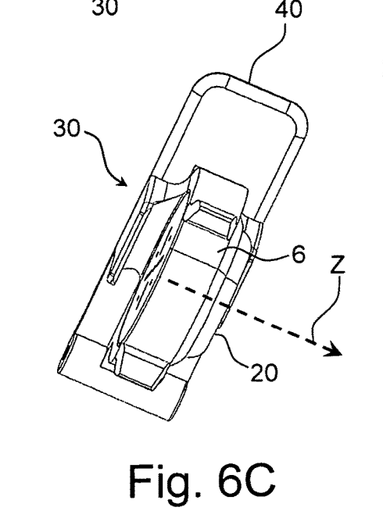
FIG. 6C shows a perspective view of the retainer structure shown in FIG. 6A.

FIG. 6A illustrates a perspective view of a battery 3 in a retainer structure 30 according to an embodiment of the disclosure. FIG. 6B illustrates a schematic back view of a battery assembly 2 according to an embodiment of the disclosure, in which the structures are transparent. FIG. 6C illustrates a perspective view of the retainer structure 30 shown in FIG. 6A and FIG. 6D illustrates a side view of the battery assembly 2 shown in FIG. 6B.

In FIG. 6A and FIG. 6C the battery 6 is received by the retainer structure 30 that is an integrated part of the lid 40. It can be seen that the retainer structure 30 defines a space that is sufficiently large to receive the battery 6 and allow the battery 6 to be displaced along the longitudinal axis Z of the battery.

Figure 6D:
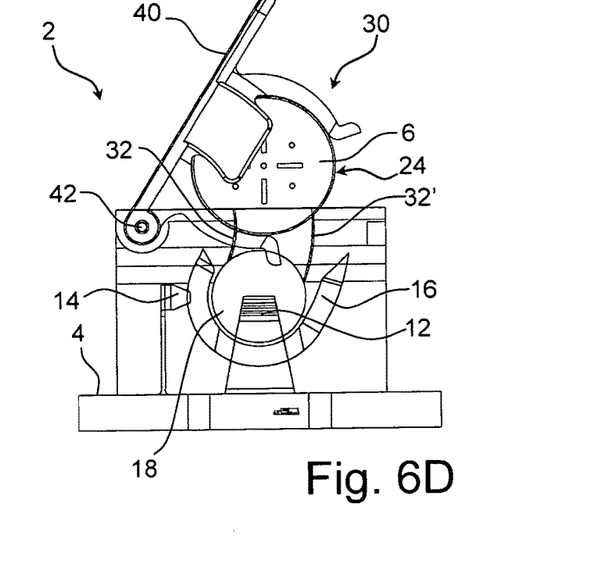
FIG. 6D shows a side view of the battery assembly shown in FIG. 6B.

In FIG. 6B and FIG. 6D the lid 40 is in an open configuration. The lid 40 is rotatably mounted to the compartment structures 8, 8' by means of joints 42. The battery assembly 2 comprises a first electrical connection member 14 having an elongated flat extension member extending perpendicular to the base structure 4. A protrusion member is provided in the distal end of the first electrical connection member 14. The protrusion member 44 has a basically V-shaped profile pointing towards the central portion of the battery assembly 2. Likewise, the battery assembly 2 comprises a second electrical connection member 12 and a third electrical connection member 12'. The second electrical connection member 12 has an elongated flat extension member that extends perpendicular to the base structure 4 and comprises a protrusion member 44 provided in the distal end. The protrusion member 44 has a basically V-shaped profile pointing towards the central portion of the battery assembly 2. The third electrical connection member 12' also has an elongated flat extension member that extends perpendicular to the base structure 4. The third electrical connection member 12' is provided with a protrusion member 44' in its distal. The protrusion member 44' has a basically V-shaped profile pointing towards the central portion of the battery assembly 2.

The protrusion members 44, 44' are configured to bear against the battery 6 in order to establish an electrical connection to the poles of the battery 6.

In FIG. 6D it can be seen that track structures 32, 32' are provided in the compartment structure. The track structures 32, 32' are adapted to guide the negative pole of the battery 6 into contact with the electrical connection members 12, 12'.

In FIG. 6B it can be seen that the second electrical connection member 12 and the third electrical connection member 12' are electrically connected by an electrical connection 34 shaped as a flat metal structure.

When the lid 40 is closed the battery 6 will be guided into a position in which the negative pole 20 of the battery 6 is electrically connected to the third electrical connection member 12' and where the positive pole of the battery is connected to the periphery 24 (and thus the positive pole) of the battery 6.

The disclosure provides a mechanical solution to allow a battery 6 to be inserted "both ways" in the battery assembly 2. The hearing device will be connected to the correct poles of the battery 2. Accordingly, the disclosure makes it easier for a hearing device user to insert a battery 6, since the users do not need to care about which way the battery 6 is inserted into the battery assembly 2. This will especially be an advantage for the users having bad finger dexterity.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

LIST OF REFERENCE NUMERALS

2 Battery assembly
4 Base structure
6 Battery
8, 8' Compartment structure
12, 12', 14 Electrical connection member
16, 16' Guide member
18, 18' Aperture
20 Negative pole
22 Positive pole
24 Periphery
26, 26' Retainer member
28, 28' Retainer member
30 Retainer structure
32, 32' Track structure
34 Electric connection
36, 36' Convex portion
38 Concave portion
40 Lid
42 Joint
44, 44' Protrusion member
D Distance
S Space
X Longitudinal axis
Y Transversal axis
Z Longitudinal axis

The invention claimed is:

1. A battery assembly for an electronic device such as a hearing aid, which battery assembly comprises:

a compartment having a longitudinal axis and a transversal axis and being configured to receive and contain a battery;
at least one electrical connection member for establishing electrical connection to a negative pole of the battery;
at least one electrical connection member for establishing electrical connection to a positive pole of the battery;
a guide structure configured to guide the battery into a predefined position in the compartment,
wherein the guide structure is configured to receive and guide the battery into electrical connection with a first electrical connection member and a second electrical connection member when the battery is in a first configuration;
wherein the guide structure is configured to receive and guide the battery into electrical connection with the first electrical connection member and a third electrical connection member when the battery is in a second configuration, in which the battery has a reversed orientation compared with the first configuration;
wherein the first electrical connection member is configured to establish electrical connection to one of the positive and negative polarities of the battery, but not the other of the positive and negative electrodes of the battery, to render the battery operative to power the electronic device, while both the second and third electrical connection members are configured to establish electrical connection to the other of the positive and negative polarities of the battery to render the battery operative to power the electronic device, thereby allowing the battery to be properly installed in the battery assembly regardless of whether the battery is installed in the first or second configuration.

2. The battery assembly according to claim 1, wherein the first electrical connection member is the electrical connection member for the positive pole of the battery, wherein the second electrical connection member and the third electrical connection member is for the negative pole of the battery.

3. The battery assembly according to claim 1, wherein the guide structure is configured to displace the battery along the transversal axis of the compartment and hereby establish electric contact with the second electrical connection member or the third electrical connection member.

4. The battery assembly according to claim 1, wherein the first electrical connection member is arranged in a position in which the guide structure establishes contact with the periphery of the battery.

5. The battery assembly according to claim 1, wherein the compartment comprises a first compartment structure and a second compartment structure and wherein a first guide member is attached to the first compartment structure and wherein a second guide member is attached to the second compartment structure.

6. The battery assembly according to claim 5, wherein the second guide member is configured to displace the battery towards the first compartment structure and hereby establish contact to a first electrical connection member, wherein the first guide member is configured to displace the battery towards the second compartment structure and hereby establish contact with a second electrical connection member.

7. The battery assembly according to claim 1, wherein the guide members comprise a central concave portion.

8. The battery assembly according to claim 7, wherein the central concave portion is provided with convex end portions.

9. The battery assembly according to claim 1, wherein the battery assembly comprises a lid rotatably attached to the compartment.

10. The battery assembly according to claim 9, wherein the lid comprises a retainer structure configured to receive and retain the battery.

11. The battery assembly according to claim 10, wherein the retainer structure comprises a first pair of retainer members configured to receive the battery and restrict displacement of the battery along the longitudinal axis of the battery, wherein the retainer structure comprises a second pair of retainer members configured to receive and bear against the periphery of the battery.

12. The battery assembly according to claim 10, wherein the retainer structure defines a space sufficiently large to receive the battery and to allow for displacement of the battery along the longitudinal axis of the battery in order to bring the battery into electrical connection with the second electrical connection member or into electrical connection with the third electrical connection member.

13. The battery assembly according to claim 1, wherein the second electrical connection member and the third electrical connection member are electrically connected by an electrical connection.

14. The battery assembly according to claim 1, wherein the second electrical connection member and/or the third electrical connection member are provided with a protrusion member in the distal end.

15. A hearing aid comprising the battery assembly according to claim 1.

16. The battery assembly according to claim 6, wherein
the first guide member comprises a pair of opposite convex end portions configured to receive the battery, and a circular shaped guide between the convex end portions configured to guide the battery into electrical connection with the first electrical connection member and the second electrical connection member when the battery is in the first configuration, and
the second guide member comprises a pair of opposite convex end portions configured to receive the battery, and a circular shaped guide between the convex end portions configured to guide the battery into electrical connection with the first electrical connection member and the third electrical connection member when the battery is in the second configuration.

* * * * *